United States Patent [19]
Hayashi et al.

[11] Patent Number: 6,022,633
[45] Date of Patent: Feb. 8, 2000

[54] MAGNETORESISTIVE EFFECT ELEMENT AND MAGNETORESISTIVE EFFECT SENSOR

[75] Inventors: Kazuhiko Hayashi; Masafumi Nakada, both of Tokyo, Japan

[73] Assignee: NEC Corporation, Tokyo, Japan

[21] Appl. No.: 08/961,199

[22] Filed: Oct. 30, 1997

[30] Foreign Application Priority Data

Oct. 31, 1996 [JP] Japan ..................................... 8-290307

[51] Int. Cl.$^7$ ...................................................... G11B 5/66
[52] U.S. Cl. .............. 428/692; 428/694 R; 428/694 TR; 428/694 T; 428/694 TS; 428/694 TM; 428/900; 360/113; 324/252
[58] Field of Search .......................... 428/694 R, 694 TR, 428/694 T, 694 TS, 694 TM, 692, 900; 360/113; 324/252

[56] References Cited

U.S. PATENT DOCUMENTS

| | | | |
|---|---|---|---|
| 5,206,590 | 4/1993 | Dieny et al. ............................. | 324/252 |
| 5,301,079 | 4/1994 | Cain et al. ............................... | 360/113 |
| 5,549,978 | 8/1996 | Iwasaki ................................... | 428/692 |

FOREIGN PATENT DOCUMENTS 2-61572  3/1990  Japan.

OTHER PUBLICATIONS

David A. Thompson, et al., "Thin Film Magnetoresistors in Memory, Storage, and Related Applications", pp. 1039–1050, IEEE Transactions on Magnetics, vol. Mag–11, No. 4, Jul. 1975.

*Primary Examiner*—Leszek Kiliman
*Attorney, Agent, or Firm*—Young & Thompson

[57] ABSTRACT

A magnetoresistive effect element having a lamination structure of a free magnetic layer, a non-magnetic layer in contact with the free magnetic layer, a pinned magnetic layer in contact with the non-magnetic layer, and an anti-ferromagnetic layer in contact with the pinned magnetic layer, wherein the product of a saturation magnetization of the pinned magnetic layer and a thickness of the pinned magnetic layer is not higher than $2 \times 10^{-9}$ T·m. The pinned magnetic layer may include a lanthanide metal.

26 Claims, 11 Drawing Sheets

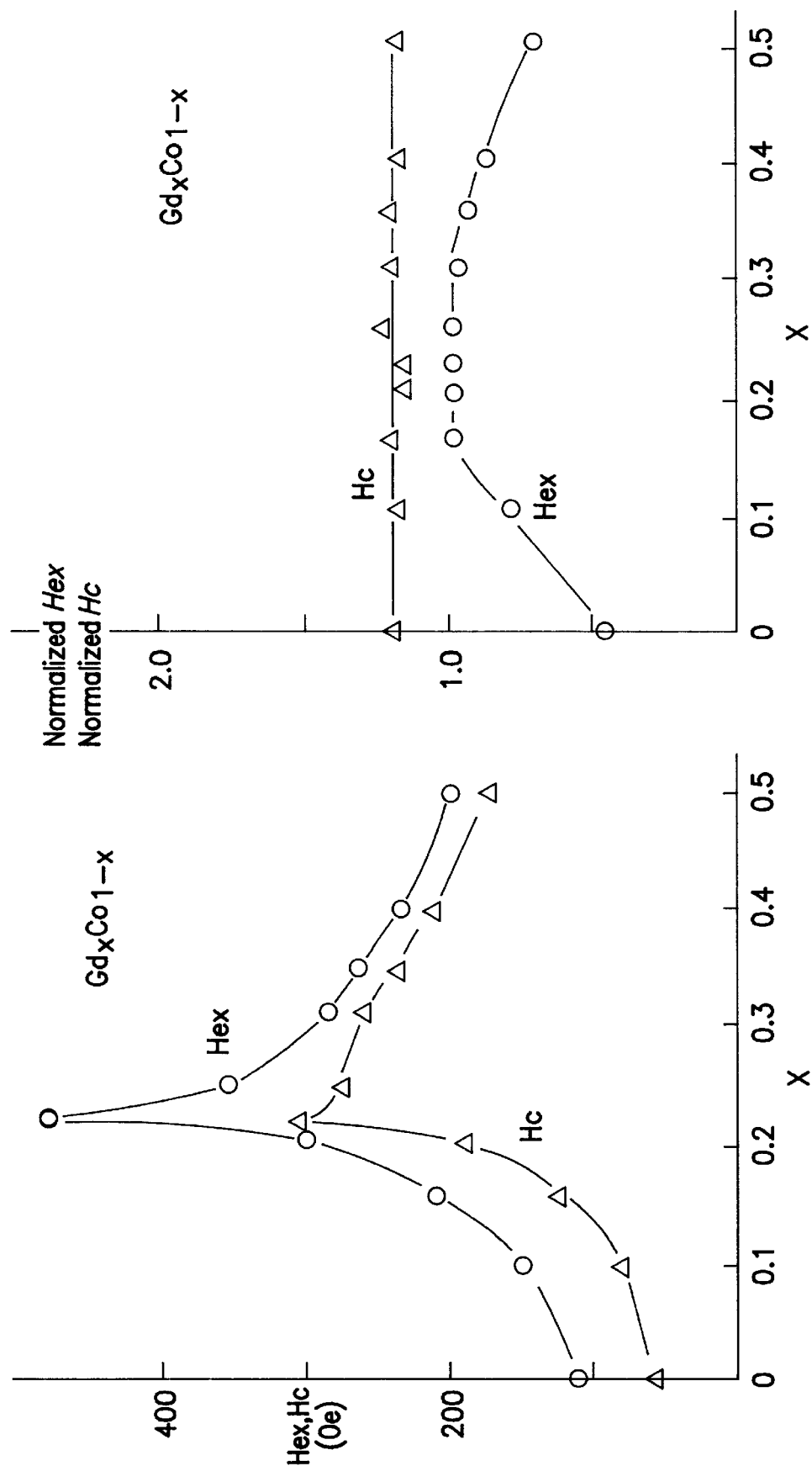

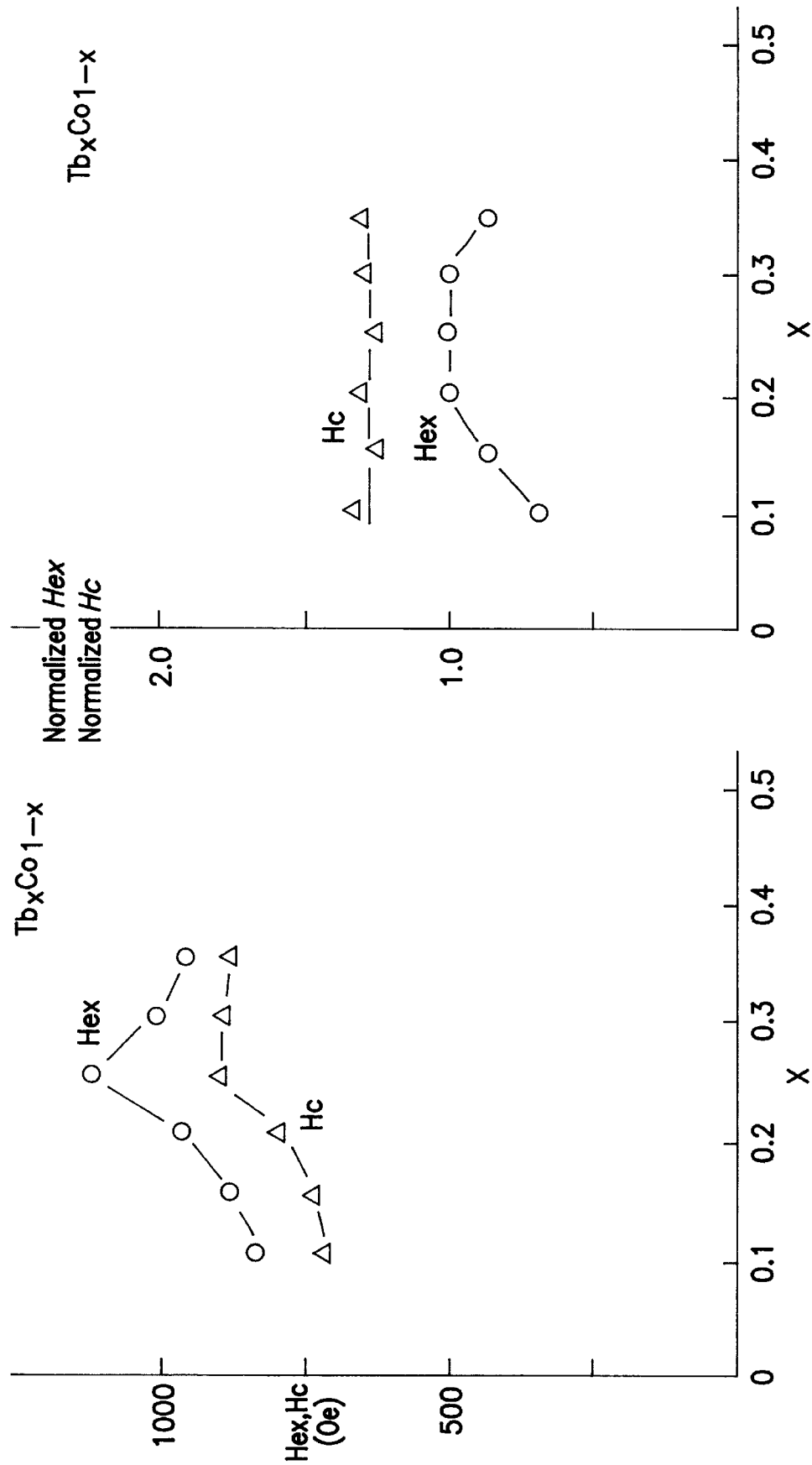

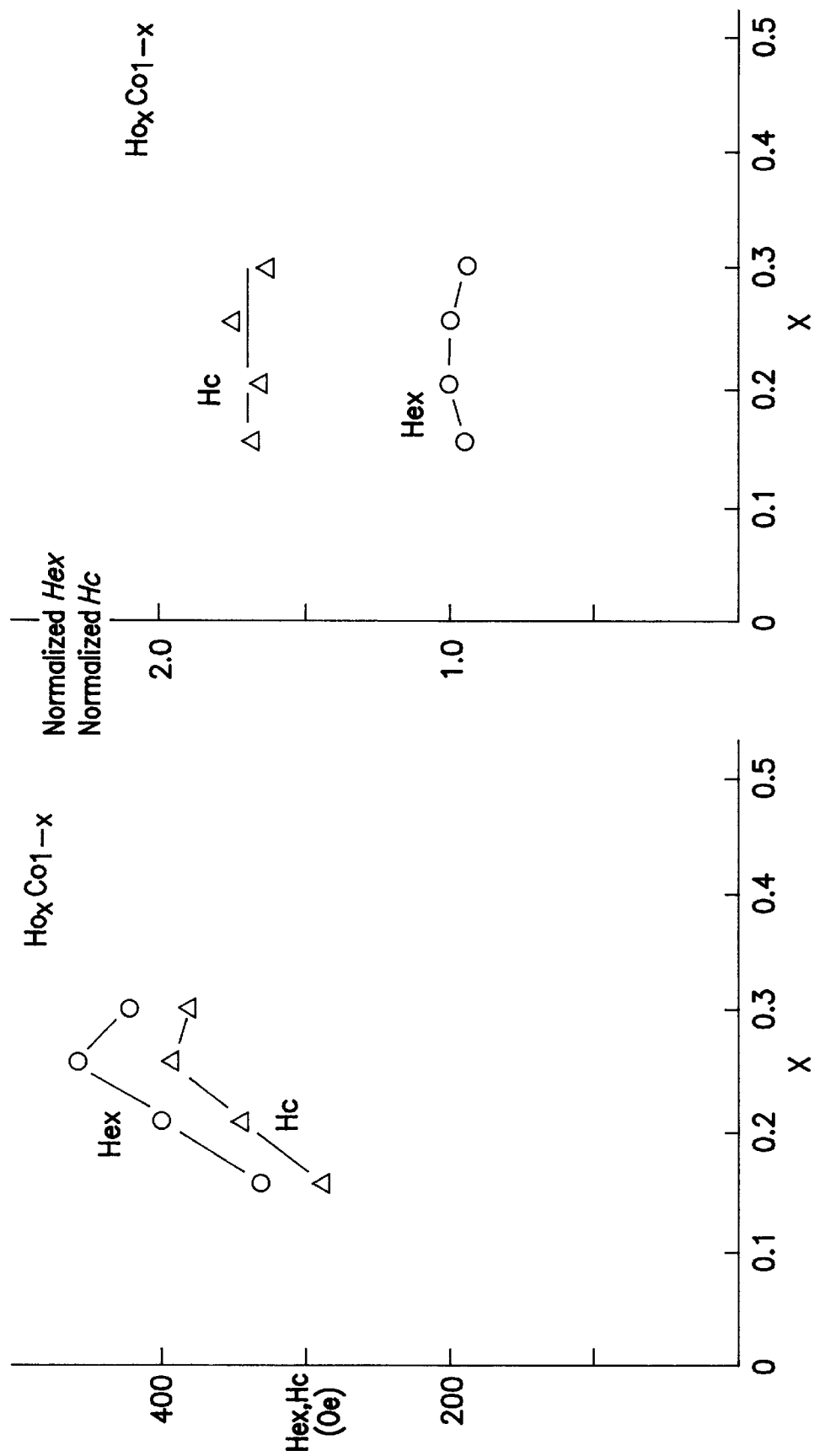

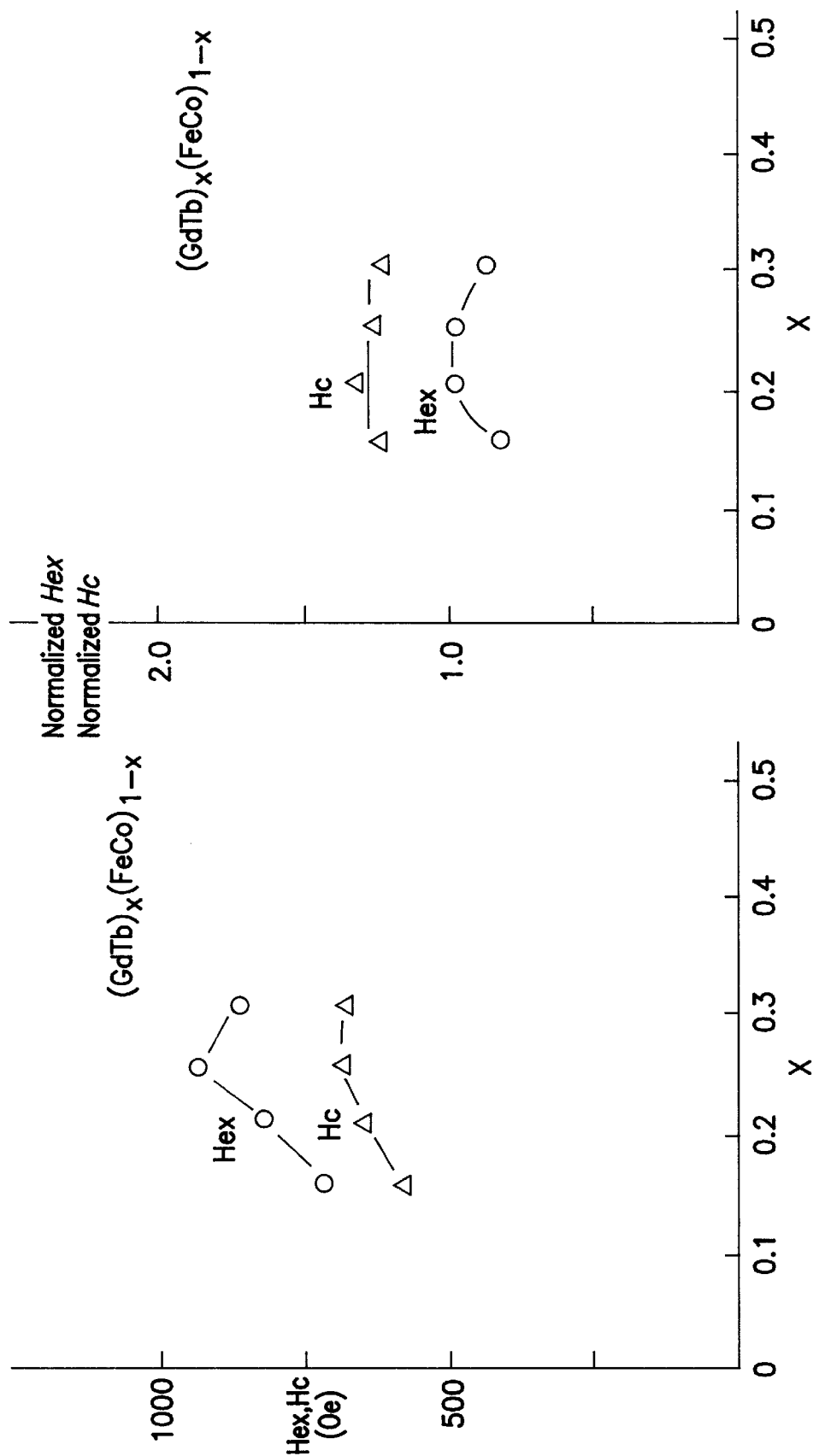

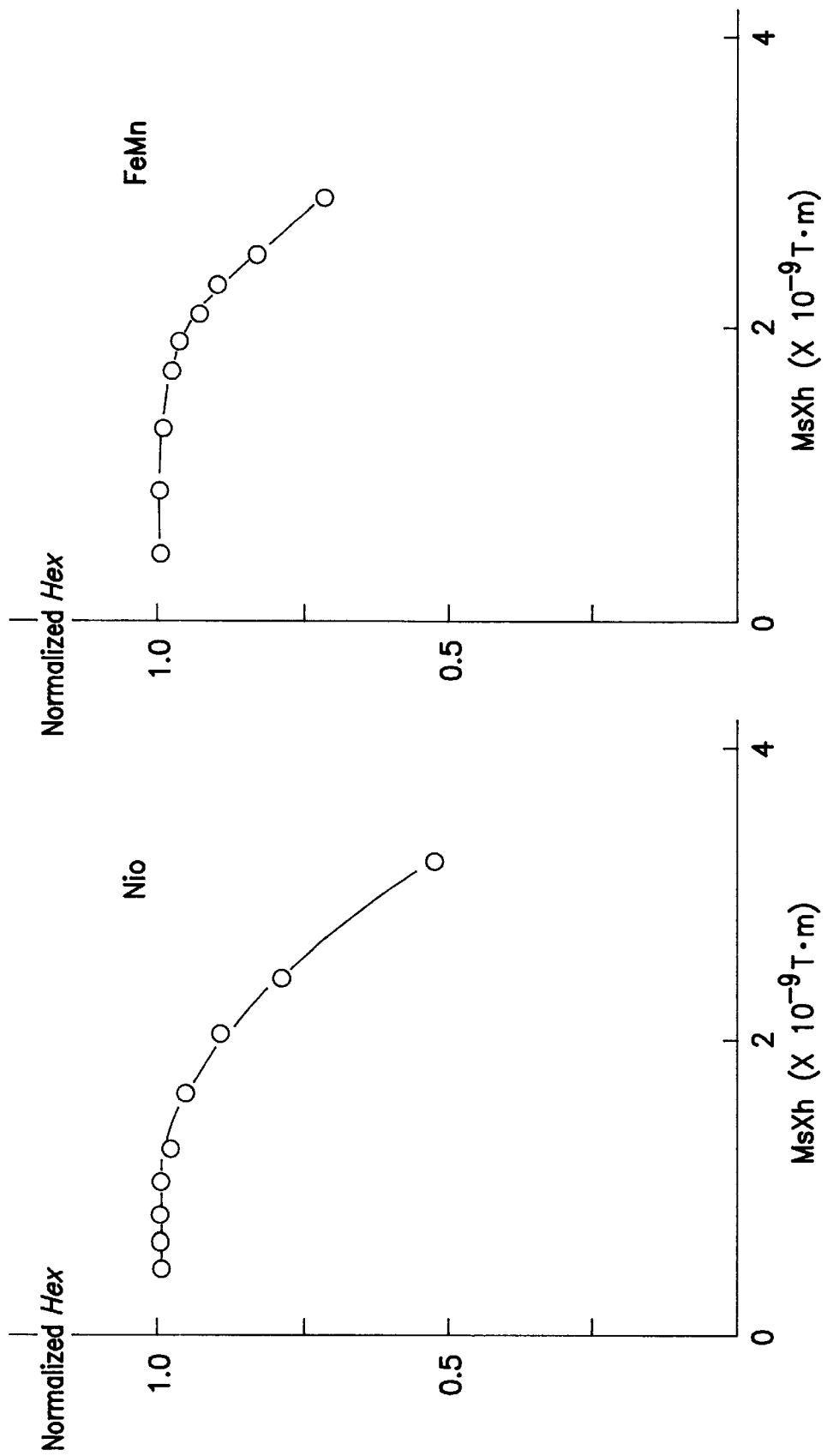

MAGNETORESISTIVE EFFECT ELEMENT AND MAGNETORESISTIVE EFFECT SENSOR

BACKGROUND OF THE INVENTION

The present invention relates to an improved magnetoresistive effect element for reading out of informations magnetically stored in a magnetic recording medium, and an improved magnetoresistive effect sensor using the magnetoresistive effect element.

The magnetoresistive effect element is capable of sensing variations of resistance, which may be regarded to be a function of intensity of magnetic flax. The magnetoresistive effect sensor is capable of detecting magnetic signals through the magnetoresistive effect element for reading out of data magnetically stored in a magnetic recording medium at a large linear density. The conventional magnetoresistive effect element utilizes the anisotropic magnetoresistive effect element which is defined to be a phenomenon of variation in resistance of the element proportionally to a square of cosine of an angle defined between a magnetization direction and a sensing current flowing through the element. The anisotropic magnetoresistive effect is described in detail by D. A. Thomson et al. "Memory Storage and Related Applications", IEEE Transaction on Mag. MAG-11, p. 1039 (1975). The magnetoresistive effect sensor using the magnetoresistive effect element is often applied with vertical bias in order to suppress Barkhausen noises. This vertical bias may be applied to anti-ferromagnetics such as FeMn, NiMn, and nickel oxide.

In recent years, a magnetoresistive effect element having a spin valve film has been developed. Such magnetoresistive effect element having a spin valve film utilizes a giant magnetoresistive effect. This giant magnetoresistive effect is a phenomenon of variation in resistance of the element both due to a spin-dependent transmission of conduction electrons between ferromagnetic layers which sandwich a non-magnetic layer and due to a spin-dependent scattering of the conduction electrons on interfaces between the ferromagnetic and non-magnetic layers. This magnetoresistive effect element shows variation in plane resistance between the ferromagnetic layers isolated by the non-magnetic layer in proportional to cosine of an angle defined between the magnetization directions of the two ferromagnetic layers. As compared to the anisotropic magnetoresistive effect element, the giant magnetoresistive effect element is improved in the sensitivity and shows a larger variation in resistance.

In Japanese laid-open patent publication No. 2-61572, it is disclosed that a laminated magnetic structure shows a large magnetoresistance variation due to anti-parallel order of magnetization in the magnetic layers. Ferromagnetic transition metals and alloys thereof are available for the laminated structure. It is further disclosed that an anti-ferromagnetic layer is added to one of the paired ferromagnetic layers isolated by the intermediate layer. FeMn is suitable for the anti-ferromagnetic layer.

In Japanese laid-open patent publication No. 4-358310, it is disclosed that the magnetoresistive effect element has two thin ferromagnetic layers isolated by a thin non-magnetic metal layer, where if an applied magnetic field is zero, then the magnetization directions of the two ferromagnetic thin layers are different by the right angle. The two ferromagnetic layers isolated from each other by the intermediate layer vary in resistance in proportional to cosine of an angle defined between the magnetization directions of those two layers but independently from a direction of current flowing through the sensor.

In Japanese laid-open patent publication No. 6-203340, it is disclosed that the magnetoresistive effect sensor has two ferromagnetic thin layers isolated by a non-magnetic metal thin layer, where if an externally applied magnetic field is zero, then anti-ferromagnetic layers adjacent to each other are kept to differ in magnetization direction by the right angle.

Either if the anti-ferromagnetic layer is used as a vertical bias layer for obtaining a magnetic stability or if the anti-ferromagnetic layer is used for the magnetoresistive effect element having the spin valve film, then FeMn is mainly used as being likely to be oxidized in atmosphere. For this reason, in order to practice the element, it is essential to add an additive or use a protection film. Notwithstanding, deterioraten in characteristic or properties of the element is caused in fabrication processes. The reliance of the conventional magnetoresistive effect element would be insufficient.

On the other hand, if NiO film or CoPt superior in corrosion resistance film is used reliance is used, then other problem is raised that hysteresis is likely to appear on the R-H loop.

If the nickel oxide based film such as FeMn, NiMn, IrMn, PdPtMn, or ReMn is used for the anti-ferromagnetic layer and if Ni-based, Fe-based, Co-based alloys are used for a pinned magnetic layer, then the following problems are raised. If the magnetic field is applied in a direction different from such a direction as to allow a uni-directional anisotropy at 100–200° C., then the magnetization of nickel oxide is inverted to the direction of the magnetic field. This means that the magnetic recording device is not useable at a high temperature of not less than 70° C., for which reason the reliance of the magnetic recording device would be insufficient.

In the above circumstances, it had been required to develop an improved magnetoresistive effect element free from the above problems and disadvantages, and a novel magnetoresistive effect sensor using the improved magnetoresistive effect element.

SUMMARY OF THE INVENTION

Accordingly, it is an object of the present invention to provide an improved magnetoresistive effect element free from the above problems and disadvantages.

It is an object of the present invention to provide an improved magnetoresistive effect element showing a large exchange-coupling magnetic field applied from an anti-ferromagnetic layer to a pinned magnetic layer.

It is a further object of the present invention to provide an improved magnetoresistive effect element having a small hysteresis on the R-H loop.

It is a still further object of the present invention to provide an improved magnetoresistive effect element having anti-ferromagnetic layers with sublattice magnetization which is stable against an external magnetic field at a temperature in the range of about 100–200° C.

It is yet a further object of the present invention to provide an improved magnetoresistive effect element showing good reproducing properties.

It is a further more object of the present invention to provide a novel magnetoresistive effect sensor which uses an improved magnetoresistive effect element free from the above problems and disadvantages.

It is an object of the present invention to provide a novel magnetoresistive effect sensor which uses an improved magnetoresistive effect element showing a large exchange-coupling magnetic field applied from an anti-ferromagnetic layer to a pinned magnetic layer.

It is moreover object of the present invention to provide a novel magnetoresistive effect sensor which uses an improved magnetoresistive effect element having a small hysteresis on the R-H loop.

It is still more object of the present invention to provide a novel magnetoresistive effect sensor which uses an improved magnetoresistive effect element having anti-ferromagnetic layers with sublattice magnetization which is stable against an external magnetic field at a temperature in the range of about 100–200° C.

It is yet more object of the present invention to provide a novel magnetoresistive effect sensor which uses an improved magnetoresistive effect element showing good reproducing properties.

It is another object of the present invention to provide a novel magnetic recording/reproducing head which uses an improved magnetoresistive effect element free from the above problems and disadvantages.

It is an object of the present invention to provide a novel magnetic recording/reproducing head which uses an improved magnetoresistive effect element showing a large exchange-coupling magnetic field applied from an anti-ferromagnetic layer to a pinned magnetic layer.

It is still another object of the present invention to provide a novel magnetic recording/reproducing head which uses an improved magnetoresistive effect element having a small hysteresis on the R-H loop.

It is yet another object of the present invention to provide a novel magnetic recording/reproducing head which uses an improved magnetoresistive effect element having anti-ferromagnetic layers with sublattice magnetization which is stable against an external magnetic field at a temperature in the range of about 100–200° C.

It is further another object of the present invention to provide a novel magnetic recording/reproducing head which uses an improved magnetoresistive effect element showing good reproducing properties.

It is an additional object of the present invention to provide a novel magnetic detecting system which uses an improved magnetoresistive effect element free from the above problems and disadvantages.

It is an object of the present invention to provide a novel magnetic detecting system which uses an improved magnetoresistive effect element showing a large exchange-coupling magnetic field applied from an anti-ferromagnetic layer to a pinned magnetic layer.

It is still additional object of the present invention to provide a novel magnetic detecting system which uses an improved magnetoresistive effect element having a small hysteresis on the R-H loop.

It is yet additional object of the present invention to provide a novel magnetic detecting system which uses an improved magnetoresistive effect element having anti-ferromagnetic layers with sublattice magnetization which is stable against an external magnetic field at a temperature in the range of about 100–200° C.

It is further additional object of the present invention to provide a novel magnetic detecting system which uses an improved magnetoresistive effect element showing good reproducing properties.

It is further additional object of the present invention to provide a novel magnetic recording system which uses an improved magnetoresistive effect element free from the above problems and disadvantages.

It is an object of the present invention to provide a novel magnetic recording system which uses an improved magnetoresistive effect element showing a large exchange-coupling magnetic field applied from an anti-ferromagnetic layer to a pinned magnetic layer.

It is further additional object of the present invention to provide a novel magnetic recording system which uses an improved magnetoresistive effect element having a small hysteresis on the R-H loop.

It is further additional object of the present invention to provide a novel magnetic recording system which uses an improved magnetoresistive effect element having anti-ferromagnetic layers with sublattice magnetization which is stable against an external magnetic field at a temperature in the range of about 100–200° C.

It is further additional object of the present invention to provide a novel magnetic recording system which uses an improved magnetoresistive effect element showing good reproducing properties.

The present invention provides a magnetoresistive effect element having lamination structures of a free magnetic layer, a non-magnetic layer in contact with the free magnetic layer, a pinned magnetic layer in contact with said non-magnetic layer, and an anti-ferromagnetic layer in contact with the pinned magnetic layer, wherein the product of a saturation magnetization of the pinned magnetic layer and a thickness of the pinned magnetic layer is not higher than $2 \times 10^{-9}$ T·m.

The pinned magnetic layer may be made of an alloy of a first metal including at least one selected from the group consisting of ferrimagnetic materials and lanthanoids and a second metal including at least one selected from the group consisting of Fe, Co, and Ni.

The following descriptions of the above magnetoresistive effect element in accordance with the present invention will be made assuming that the anti-ferromagnetic layer is made of one selected from the group consisting of nickel oxide based materials, FeMn, NiMn, IrMn, PdPtMn and ReMn, whilst the pinned magnetic layer is made of one selected from the group consisting of Ni-based materials, Fe-based materials and Co-based materials, A magnetic field is applied in a direction different from such a direction as to allow unidirectional anisotropy, for example, from the anti-ferromagnetic layer toward the pinned magnetic layer at a temperature in the range of about 100–200° C. In this case, the reason why the magnetization direction of the anti-ferromagnetic layer is inverted to the direction of the externally applied magnetic field would be in the fact that the magnetization of the pinned magnetic layer is first directed to the externally applied magnetic field and then the direction of the magnetization of the pinned magnetic layer is transcribed to the magnetization of the anti-ferromagnetic layer. The allowance of this directional transcription of magnetization from the pinned magnetic layer to the anti-ferromagnetic layer means to allow the magnetization unstability of the anti-ferromagnetic layer. In order to prevent such magnetization unstability of the anti-ferromagnetic layer, it is required that the pinned magnetic layer is capable of preventing inversion or change of the magnetization direction of the pinned magnetic layer. Otherwise, it is required to prevent such the transcription of the magnetization direction from the pinned magnetic layer to the anti-ferromagnetic layer.

In order to prevent the inversion or change of the magnetization direction of the pinned magnetic layer, it is required to increase an exchange-coupling magnetic field Hex applied in a direction from the anti-ferromagnetic layer to the pinned magnetic layer. Otherwise, it is required to increase a coercive force Hc. The exchange-coupling magnetic field Hex is proportional to an interfacial magnetic domain wall energy density between the anti-ferromagnetic layer and the pinned magnetic layer. The interfacial magnetic domain wall energy density is given by σ w/(Ms·h), where Ms is the saturation magnetization of the pinned magnetic layer, h is the thickness of the pinned magnetic layer. If the product Ms·h of the saturation magnetization of the pinned magnetic layer and the thickness of the pinned magnetic layer is decreased, then the exchange-coupling magnetic field Hex is increased. Further, the ferrimagnetic materials have a magnetization structure wherein two kinds of the sublattice magnetization are located in anti-parallel directions. If the size of the individual sublattice magnetization is close to each other so that the ferrimagnetic material approaches a compensation composition, then the coercive force Hc is large but the saturation magnetization of the ferrimagnetic material. If the two magnetic layers are in contact with each other, then the increase in the product of the product Ms·h of the saturation magnetization of the magnetic layer and the thickness of the magnetic layer promotes or facilitates the transcription of the inversion or change of the magnetization direction of one of the magnetic layer to the counter one of the magnetic layer. By contrast, the decrease in the product of the product Ms·h of the saturation magnetization of the magnetic layer and the thickness of the magnetic layer prevents or suppress the transcription of the inversion or change of the magnetization direction of one of the magnetic layer to the counter one of the magnetic layer. From the above, it can be understood that in order to solve the problem with unstability in magnetization direction of the anti-ferromagnetic layer, it is required to reduce the product of Ms·h of the saturation magnetization of the pinned magnetic layer and the thickness of the pinned magnetic layer, for which reason the product of the saturation magnetization of the pinned magnetic layer and the thickness of the pinned magnetic layer is not higher than a critical value, for example, $2 \times 10^{-9}$ T·m.

It is possible to provide a magnetoresistance detecting system by adding the above magnetoresistance effect sensor using the improved magnetoresistance effect element with both a current applying device for applying a current flowing through the magnetoresistance effect sensor and a magnetoresistance detector for detecting variation in magnetoresistance of the above magnetoresistance effect sensor.

It is also possible to provide a magnetic recording system by adding the above magnetoresistance detecting system with a magnetic recording medium for magnetically recording data, a magnetic recording system for storing data into the magnetic recording medium, and an actuator for moving the above magnetoresistance detecting system and the magnetic recording system to a selected position over the magnetic recording medium.

BRIEF DESCRIPTION OF THE DRAWINGS

Preferred embodiments according to the present invention will be described with reference to the accompanying drawings.

FIG. 7 is a graph illustrative of variations in exchange-coupling magnetic field Hex and coercive force Hc of a pinned magnetic layer of $Gd_xCo_{1-x}$ versus index "x" of $Gd_xCo_{1-x}$.

FIG. 8 is a graph illustrative of variations in normalized exchange-coupling magnetic field Hex and normalized coercive force Hc of a pinned magnetic layer of $Gd_xCo_{1-x}$ versus index "x" of $Gd_xCo_{1-x}$.

FIG. 9 is a graph illustrative of variations in exchange-coupling magnetic field Hex and coercive force Hc of a pinned magnetic layer of $Tb_xCo_{1-x}$ versus index "x" of $Tb_xCo_{1-x}$.

FIG. 10 is a graph illustrative of variations in normalized exchange-coupling magnetic field Hex and normalized coercive force Hc of a pinned magnetic layer of $Tb_xCo_{1-x}$ versus index "x" of $Tb_xCo_{1-x}$.

FIG. 13 is a graph illustrative of variations in exchange-coupling magnetic field Hex and coercive force Hc of a pinned magnetic layer of $Ho_xCo_{1-x}$ versus index "x" of $Ho_xCo_{1-x}$.

FIG. 14 is a graph illustrative of variations in normalized exchange-coupling magnetic field Hex and normalized coercive force Hc of a pinned magnetic layer of $Ho_xCo_{1-x}$ versus index "x" of $Ho_xCo_{1-x}$.

FIG. 15 is a graph illustrative of variations in exchange-coupling magnetic field Hex and coercive force Hc of a pinned magnetic layer of $(GdTb)_x(FeCo)_{1-x}$ versus index "x" of $(GdTb)_x(FeCo)_{1-x}$.

FIG. 16 is a graph illustrative of variations in normalized exchange-coupling magnetic field Hex and normalized coercive force Hc of a pinned magnetic layer of $(GdTb)_x(FeCo)_{1-x}$ versus index "x" of $(GdTb)_x(FeCo)_{1-x}$.

FIG. 17 is a graph illustrative of variation in normalized exchange-coupling magnetic field Hex of a pinned magnetic layer versus the product of Ms·h of the saturation magnetization of the pinned magnetic layer and the thickness of the pinned magnetic layer, where an anti-ferromagnetic layer is made of NiO, in accordance with the present invention.

FIG. 18 is a graph illustrative of variation in normalized exchange-coupling magnetic field Hex of a pinned magnetic layer versus the product of Ms·h of the saturation magnetization of the pinned magnetic layer and the thickness of the pinned magnetic layer, where an anti-ferromagnetic layer is made of FeMn, in accordance with the present invention.

DISCLOSURE OF THE INVENTION

Figure 1:
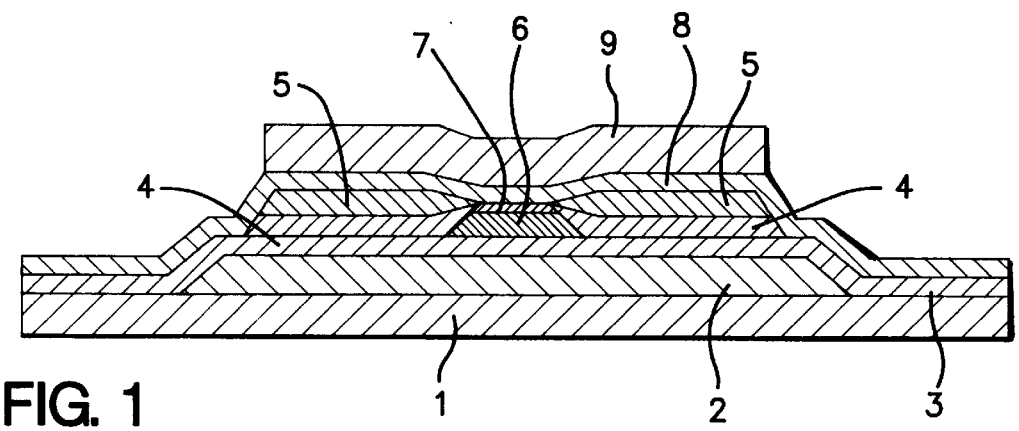
FIG. 1 is a fragmentary cross sectional elevation view illustrative of a magnetoresistive effect sensor in accordance with the present invention.

A novel magnetoresistive effect sensor in accordance with the present invention will be described in more detail with reference to FIG. 1 is illustrative of a magnetoresistive effect sensor. The magnetoresistive effect sensor is formed on a substrate 1. A bottom shielding layer 2 is selectively provided on a top surface of the substrate 1. The bottom shielding layer 2 has a sloped edge. A bottom gap layer 3 is further provided which extends over the bottom shielding layer 2 and the substrate 1. A magnetoresistive effect element 6 is selectively provided on a center area of the top surface of the bottom gap layer 3. The magnetoresistive effect element 6 has a sloped edge. An insulation layer 7 is provided on a top surface of the magnetoresistive effect element 6. A vertical bias layer 4 is formed around the magnetoresistive effect element 6 and on the top surface of the bottom gap layer 3. The vertical bias layer 4 extends over the sloped edges of the magnetoresistive effect element 6. The vertical bias layer 4 does not extend over the sloped portion of the bottom gap layer 3. Bottom electrode layers 5 are provided which extend over the vertical bias layer 4. The bottom electrode layers 5 do not extend over the insulation layer 7. A gap between the bottom electrode layers 5 is defined by the plane size of the insulation layer 7. A top gap layer 8 is entirely provided which extends over the top surface of the insulation layer 7, the top surface and sloped edges of the bottom electrode layer 5, the sloped edges of the vertical bias layer 4, the sloped portions and the low-leveled portions of the bottom gap layer 3. A top shielding layer 9 is provided which extends over the top surface of the top gap layer 8.

The bottom shielding layer 2 may be made of one selected from the group consisting of NiFe system alloys, CoZr system alloys, FeAlSi, iron nitride system alloys. The bottom shielding layer 2 may have a thickness in the range of 0.5–10 micrometers. The bottom gap layer 3 may be made of one selected from the group consisting of aluminum oxide, silicone dioxide, aluminum nitride, silicon nitride, diamond like carbon and the like. The bottom gap layer 3 may preferably have a thickness in the range of 0.01–0.20 micrometers. The bottom electrode layer 5 may be made of one selected from the group consisting of Zr, Ta, Mo, alloys thereof, and mixture thereof. The bottom electrode layer 5 may preferably have a thickness in the range of 0.01–0.10 micrometers. The vertical bias layer 4 may be made of one selected from the group consisting of CoCrPt, CoCr, CoPt, CoCrTa, FeMn, NiMn, NiO, NiCoO, IrMn, PtPdMn, ReMn, and the like. The insulation layer 7 may be made of one selected from the group consisting of aluminum oxide, silicone dioxide, aluminum nitride, silicon nitride, diamond like carbon and the like. The insulation layer 7 may preferably have a thickness in the range of 0.005–0.05 micrometers. The top gap layer 8 may be made of one selected from the group consisting of aluminum oxide, silicone dioxide, aluminum nitride, silicon nitride, diamond like carbon and the like. The top gap layer 8 may preferably have a thickness in the range of 0.01–0.20 micrometers.

Figure 2:
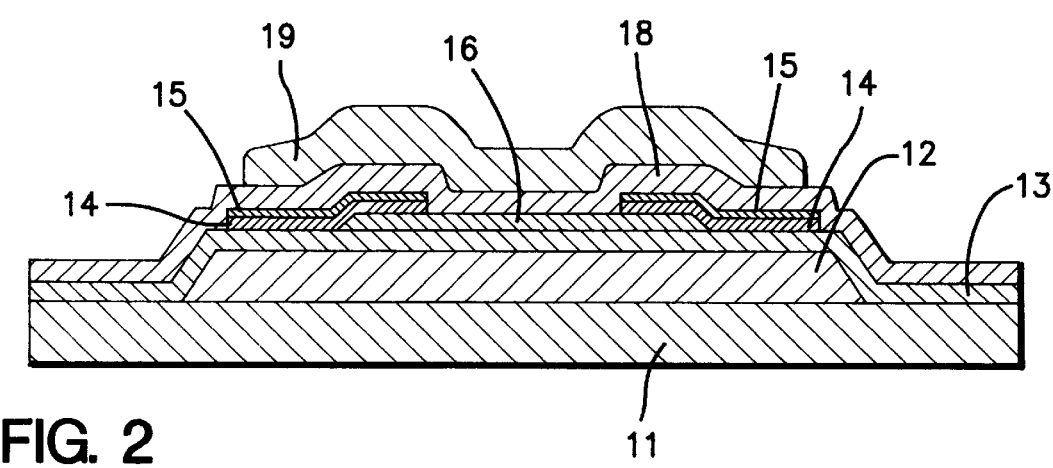
FIG. 2 is a fragmentary cross sectional elevation view illustrative of another magnetoresistive effect sensor in accordance with the present invention.

FIG. 2 is illustrative of another magnetoresistive effect sensor. The magnetoresistive effect sensor is formed on a substrate 11. A bottom shielding layer 12 is selectively provided on a top surface of the substrate 11. The bottom shielding layer 12 has a sloped edge. A bottom gap layer 13 is further provided which extends over the bottom shielding layer 12 and the substrate 11. A magnetoresistive effect element 16 is selectively provided on a top surface of the bottom gap layer 13. The magnetoresistive effect element 16 has a sloped edge. A vertical bias layer 14 is formed which extends on a peripheral region of the top surface of the magnetoresistive effect element 16 and also extends on the sloped portion of the magnetoresistive effect element 16 and further extends around the magnetoresistive effect element 16 and on the top surface of the bottom gap layer 13. The vertical bias layer 14 does not extend over the sloped portion of the bottom gap layer 13. Bottom electrode layers 15 are provided which extend over the vertical bias layer 14. A top gap layer 18 is entirely provided which extends over the magnetoresistive effect element 16, the bottom electrode layer 15, and the sloped portions and the low-leveled portions of the bottom gap layer 13. A top shielding layer 19 is provided which extends over the top gap layer 18.

The bottom shielding layer 12 may be made of one selected from the group consisting of NiFe system alloys, CoZr system alloys, FeAlSi, iron nitride system alloys. The bottom shielding layer 12 may have a thickness in the range of 0.5–10 micrometers. The bottom gap layer 13 may be made of one selected from the group consisting of aluminum oxide, silicone dioxide, aluminum nitride, silicon nitride, diamond like carbon and the like. The bottom gap layer 13 may preferably have a thickness in the range of 0.01–0.20 micrometers. The bottom electrode layer 15 may be made of one selected from the group consisting of Zr, Ta, Mo, alloys thereof, and mixture thereof. The bottom electrode layer 15 may preferably have a thickness in the range of 0.01–0.10 micrometers. The vertical bias layer 14 may be made of one selected from the group consisting of CoCrPt, CoCr, CoPt, CoCrTa, FeMn, NiMn, NiO, NiCoO, IrMn, PtPdMn, ReMn, and the like. The top gap layer 18 may be made of one selected from the group consisting of aluminum oxide, silicone dioxide, aluminum nitride, silicon nitride, diamond like carbon and the like. The top gap layer 18 may preferably have a thickness in the range of 0.01–0.20 micrometers.

Figure 3:
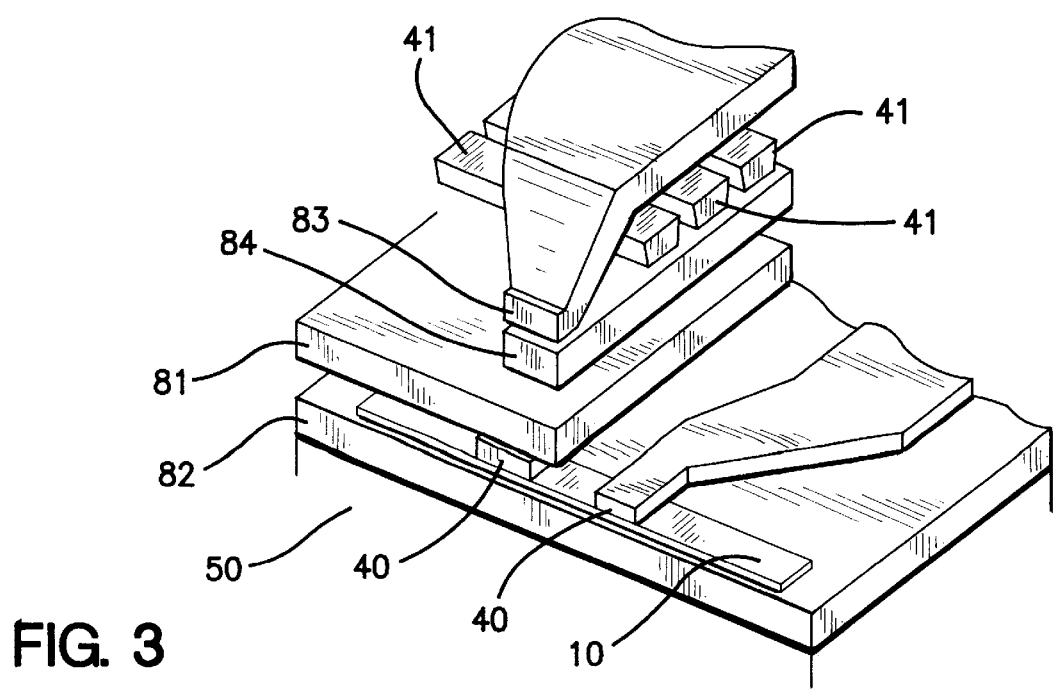
FIG. 3 is a schematic view illustrative of a magnetic recording/reproducing head using a magnetoresistive effect sensor in accordance with the present invention.

The above magnetoresistive effect sensors shown in FIGS. 1 and 2 may be applicable to a recording/reproducing head wherein a recording head using an inductive coil is united with the magnetoresistive effect sensor. The recording/reproducing head using the above magnetoresistive effect sensor will be described in detail with reference to FIG. 3. The recording/reproducing head comprises a reproducing head using the above magnetoresistive effect sensor in accordance with the present invention and an inductive recording head. Although FIG. 3 illustrates a combination of the magnetoresistive effect sensor with the recording head for longitudinal magnetic recording, there is also available another combination of the magnetoresistive effect sensor with the recording head for vertical magnetic recording. The recording/reproducing head comprises a recording head and a reproducing head. The reproducing head is formed on a substrate 50. The recording head is provided over the reproducing head. The reproducing head comprises a bottom shielding layer 82, a magnetoresistive effect element 10, electrodes 40, and top shielding layer 81. The bottom shielding layer 82 is provided on an entire top surface of the substrate 50. The magnetoresistive effect element 10 is selectively provided on the top surface of the bottom shielding layer 82. The magnetoresistive effect element 10 is the form of a slender strip. A pair of the electrodes 40 are provided which extend over the magnetoresistive effect element 10 and the top surface of the bottom shielding layer 82. The electrodes 40 are distanced at a predetermined gap. The top shielding layer 81 is provided over the electrodes 40. On the other hand, the recording head comprises a bottom magnetic layer 84, coils 41 and a top magnetic layer 83. The bottom magnetic layer 84 is provided over the top shielding layer 81 of the reproducing head. The coils 41 are provided over the bottom magnetic layer 84. The top magnetic layer 83 are provided over the coils 41 and over the bottom magnetic layer 84. The end portions of the top magnetic layer 83 are sloped down to approach the end portions of the bottom magnetic layer 84, for which reason the top magnetic layer 83 is not flat to vary in level whilst the bottom magnetic layer 84 is flat.

As a modification to the above, it is available that the top shielding layer 81 and the bottom magnetic layer 84 are unitary formed to be a single layer. The recording head acts to write signals or data onto a magnetic recording medium, whilst the reproducing head acts to read signals or data out of the magnetic recording medium. As illustrated in FIG. 3, a sensing portion of the reproducing head and a magnetic gap of the recording head are superimposed over the same slider for simultaneous positioning over the same track of the magnetic recording medium. The above head is formed to be a head slider so that the head slider is mounted on the magnetic recording/reproducing device.

Figure 4:
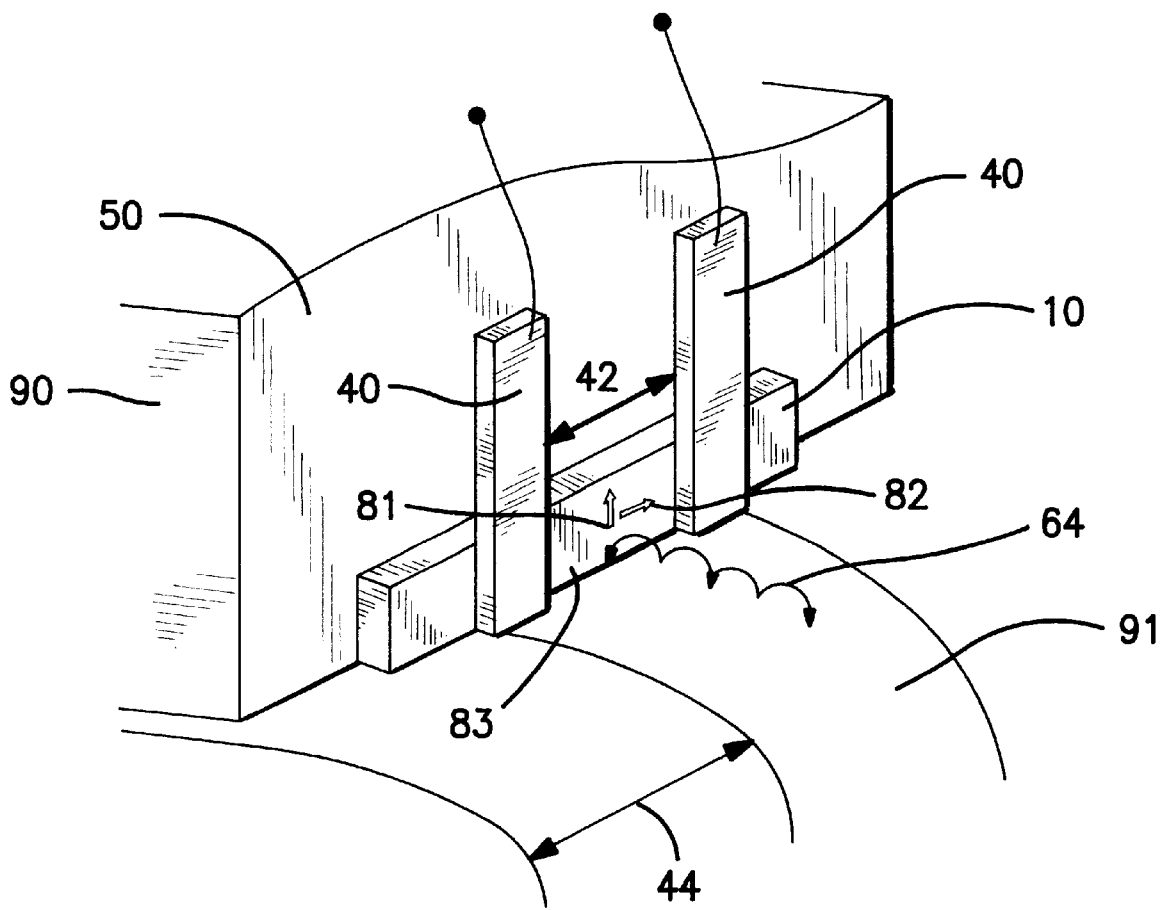
FIG. 4 is a schematic view illustrative of a magnetic recording/reproducing device using a magnetoresistive effect sensor in accordance with the present invention.

FIG. 4 is illustrative of a magnetic recording/reproducing device using a magnetoresistive effect sensor. A substrate 50 acts as a head slider 90. A magnetoresistive effect element 10 is provided on a lowest area of a front surface of the substrate 50. The magnetoresistive effect element 10 is in the form of a slender strip which horizontally extends along a lowest area of the front surface of the substrate 50. Electrodes 40 are provided on the magnetoresistive effect element 10 and over the front surface of the substrate 50. The electrodes 42 are distanced from each other by a gap 42 between the electrodes 40. The magnetic recording medium 91 rotates so that the head slider 90 shows a relative movement to the magnetic recording medium 91. The head slider 90 is kept to be over 0.2 micrometers or less or in contact with the surface of the magnetic recording medium, so that the magnetoresistive sensor 45 is then positioned over the magnetic recording medium 91 for reading out the signals or data magnetically stored in the magnetic recording medium.

Figure 5:
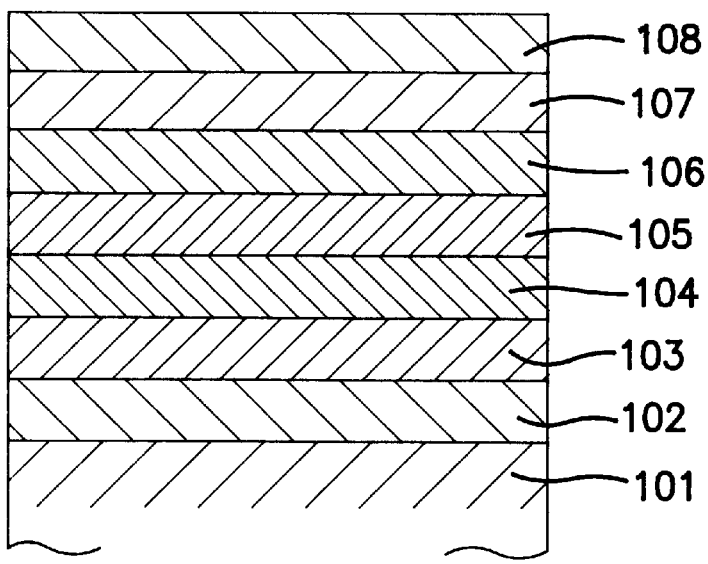
FIG. 5 is a cross sectional elevation view illustrative of a laminated structure of a magnetoresistive effect element in accordance with the present invention.

FIG. 5 is illustrative of a laminated structure of the above magnetoresistive effect element involved in the magnetoresistive effect sensor. The magnetoresistive effect element has the following lamination structure. An anti-ferroelectric layer 102 is laminated on a base layer 101. A pinned magnetic layer 103 is laminated on the base layer 101. A first magnetoresistive effect enhancement layer 104 is laminated on the pinned magnetic layer 103. A non-magnetic layer 105 is laminated on the first magnetoresistive effect enhancement layer 104. A second magnetoresistive effect enhancement layer 106 is laminated on the non-magnetic layer 105. A free magnetic layer 107 is laminated on the second magnetoresistive effect enhancement layer 106. A protection layer 108 is laminated on the free magnetic layer 107. The pinned magnetic layer 103 may be made of an alloy of a first metal including at least one selected from the group consisting of ferrimagnetic materials and lanthanoids and a second metal including at least one selected from the group consisting of Fe, Co, and Ni. Preferably, the pinned magnetic layer 103 may be made of GdFe, GdFeCo, TbFe, TbFeCo, DyFe, DyFeCo, HoFe, HoFeCo, NdFe, NdFeCo or mixtures thereof. Further, the pinned magnetic layer 103 may preferably be made of Ni—Mn—Ti, Ni—Al, Mn—Fe—Cr Garnet or Ga-added Y—Fe Garnet. The thickness of the pinned magnetic layer 103 is preferably in the range of about 1–50 nanometers.

The first magnetoresistive effect enhancement layer 104 may be made of Co, Fe, Ni, NiFeCo, or FeCo. The thickness of the first magnetoresistive effect enhancement layer 104 is preferably in the range of about 0.5–5 nanometers. If the first magnetoresistive effect enhancement layer is not formed, then the magnetoresistive rate is slightly reduced although the fabrication processes are reduced.

The non-magnetic layer 105 may be made of Cu, Cu added with about 1–20 at % of Ag, Cu added with about 1–20 at % of Re, or Cu—Au alloys. The thickness of the non-magnetic layer 105 is preferably in the range of about 2–4 nanometers.

The second magnetoresistive effect enhancement layer 106 may be made of Co, NiFe, or FeCo. The thickness of the second magnetoresistive effect enhancement layer 106 is preferably in the range of about 0.5–3 nanometers. If the second magnetoresistive effect enhancement layer is not formed, then the magnetoresistive rate is slightly reduced although the fabrication processes are reduced.

The free magnetic layer 107 may be made of NiFe, NiFeCo, CoZrNb, CoZrMo, FeCoB, Sendust, iron nitride system, FeCo, or mixture thereof. The free magnetic layer 107 may comprise a single layer made of the above materials or laminated layers. The thickness of the free magnetic layer 107 is preferably in the range of 1–10 nanometers. If the free magnetic layer 107 is made of a material including NiFe, NiFeCo, CoZrNb, CoZrMo, or FeCoB, then the base layer may be made of Ta, Hf, Zr, W, or amorphous materials such as CoZrMo, CoZrNb, CoFeB so that the crystal quality of the free magnetic layer 107 and the non-magnetic layer 105 is improved and the magnetoresistive rate is also improved.

The protection layer 108 may be made of oxide or nitride of the group consisting of Al, Si, Ta, and Ti. Alternatively, the protection layer 108 may also be made of one selected from the group consisting of Cu, Au, Tg, Ta, Hf, Zr, Ir, Si, Pt, Ti, Cr, Al, and C, and mixtures thereof. The protection layer 108 may improve the corrosion resistance. If the protection layer 108 is not formed, then the corrosion resistance is reduced although the fabrication processes are reduced.

Figure 6:
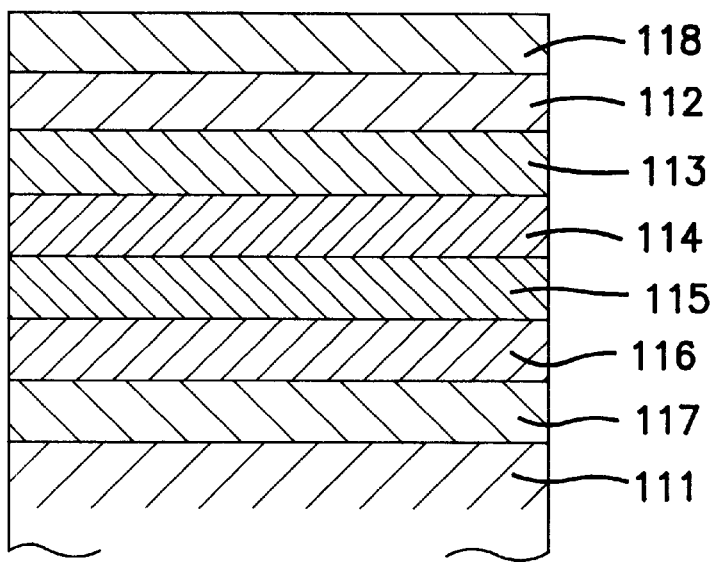
FIG. 6 is a cross sectional elevation view illustrative of a laminated structure of another magnetoresistive effect element in accordance with the present invention.

FIG. 6 is illustrative of a laminated structure of the above magnetoresistive effect element involved in the magnetoresistive effect sensor. The magnetoresistive effect element has the following lamination structure. A free magnetic layer 117 is laminated on a base layer 111. A second magnetoresistive effect enhancement layer 116 is laminated on the free magnetic layer 117. A non-magnetic layer 115 is laminated on the second magnetoresistive effect enhancement layer 116. A first magnetoresistive effect enhancement layer 114 is laminated on the non-magnetic layer 115. A pinned magnetic layer 113 is laminated on the first magnetoresistive effect enhancement layer 114. An anti-ferroelectric layer 112 is laminated on the pinned magnetic layer 113. A protection layer 118 is laminated on the anti-ferroelectric layer 112. The pinned magnetic layer 113 may be made of an alloy of a first metal including at least one selected from the group consisting of ferrimagnetic materials and lanthanoids and a second metal including at least one selected from the group consisting of Fe, Co, and Ni. Preferably, the pinned magnetic layer 113 may be made of GdFe, GdFeCo, TbFe, TbFeCo, DyFe, DyFeCo, HoFe, HoFeCo, NdFe, NdFeCo or mixtures thereof. Further, the pinned magnetic layer 113 may preferably be made of Ni—Mn—Ti, Ni—Al, Mn—Fe—Cr Garnet or Ga-added Y—Fe Garnet. The thickness of the pinned magnetic layer 113 is preferably in the range of about 1–50 nanometers.

The first magnetoresistive effect enhancement layer 114 may be made of Co, Fe, Ni, NiFeCo, or FeCo. The thickness of the first magnetoresistive effect enhancement layer 114 is preferably in the range of about 0.5–5 nanometers. If the first magnetoresistive effect enhancement layer is not formed, then the magnetoresistive rate is slightly reduced although the fabrication processes are reduced.

The non-magnetic layer 115 may be made of Cu, Cu added with about 1–20 at % of Ag, Cu added with about 1–20 at % of Re, or Cu—Au alloys. The thickness of the non-magnetic layer 115 is preferably in the range of about 2–4 nanometers.

The second magnetoresistive effect enhancement layer 116 may be made of Co, NiFe, or FeCo. The thickness of the second magnetoresistive effect enhancement layer 116 is preferably in the range of about 0.5–3 nanometers. If the second magnetoresistive effect enhancement layer is not formed, then the magnetoresistive rate is slightly reduced although the fabrication processes are reduced.

The free magnetic layer 117 may be made of NiFe, NiFeCo, CoZrNb, CoZrMo, FeCoB, Sendust, iron nitride system, FeCo, or mixture thereof. The free magnetic layer 117 may comprise a single layer made of the above materials or laminated layers. The thickness of the free magnetic layer 117 is preferably in the range of 1–10 nanometers. If the free magnetic layer 117 is made of a material including NiFe, NiFeCo, CoZrNb, CoZrMo, or FeCoB, then the base layer may be made of Ta, Hf, Zr, W, or amorphous materials such as CoZrMo, CoZrNb, CoFeB so that the crystal quality of the free magnetic layer 117 and the non-magnetic layer 115 is improved and the magnetoresistive rate is also improved.

The protection layer 118 may be made of oxide or nitride of the group consisting of Al, Si, Ta, and Ti. Alternatively, the protection layer 118 may also be made of one selected from the group consisting of Cu, Au, Tg, Ta, Hf, Zr, Ir, Si, Pt, Ti, Cr, Al, and C, and mixtures thereof. The protection layer 118 may improve the corrosion resistance. If the protection layer 118 is not formed, then the corrosion resistance is reduced although the fabrication processes are reduced.

For comparison with the present invention, the magnetoresistive effect element is formed which comprises a lamination stricture of glass substrate/NiO(50 nm)/Co$_{90}$Fe$_{10}$ (3.0 nm)/Cu(2.5 nm)/Co$_{90}$Fe$_{10}$(2.0 nm)/Ni$_{80}$ Fe$_{20}$(4 nm). The above layers are grown by magnetron sputtering system under application of magnetic field of 500 Oe. The magnetic field is applied in a direction parallel to the magnetic field of the layer to draw M-H curve. An exchange coupling magnetic field Hex=315 Oe is applied to the Co$_{90}$Fe$_{10}$(3.0 nm) pinned magnetic layer. A magnetic field of 500 Oe is applied in anti-parallel direction to the direction of the magnetic field application and a heat treatment is carried out at 120° C. for one hour. As a result, the exchange coupling magnetic field is reduced by 50% from the initial value thereof If the reduction in the exchange coupling magnetic field is large, this means that the sublattice magnetization of NiO is unstable in combination of magnetic field to temperature.

The magnetoresistive effect element is formed which comprises a lamination structure of glass substrate/NiO(50 nm)/Gd$_x$Co$_{1-x}$(10 nm)/Cu(2.5 nm)/Co$_{90}$Fe$_{10}$(2.0 nm)/Ni$_{80}$Fe$_{20}$(4 nm). The above layers are grown by magnetron sputtering system under application of magnetic field of 500 Oe.

FIG. 7 is a graph illustrative of variations in exchange-coupling magnetic field Hex and coercive force Hc of a pinned magnetic layer of Gd$_x$Co$_{1-x}$ versus index "x" of Gd$_x$Co$_{1-x}$. The rate of variation in magnetoresistance is about 4.8%.

FIG. 8 is a graph illustrative of variations in normalized exchange-coupling magnetic field Hex and normalized coercive force Hc of a pinned magnetic layer of Gd$_x$Co$_{1-x}$ versus index "x" of Gd$_x$Co$_{1-x}$, wherein the rate of variation in magnetoresistance is about 4.8%. A magnetic field of 500 Oe is applied in anti-parallel direction to the direction of the magnetic field application and a heat treatment is carried out at 120° C. for one hour. The normalized exchange-coupling magnetic field Hex means the value obtained by normalizing the exchange-coupling magnetic field Hex after the treatment with the exchange-coupling magnetic field Hex before the treatment. The normalized coercive force Hc means the value obtained by normalizing the coercive force Hc after the treatment with the coercive force Hc before the treatment. As the index x is increased, then the normalized exchange-coupling magnetic field Hex is increased up to 1.0 at x=0.16–0.31. As the index x is further increased from 0.31, the normalized exchange-coupling magnetic field Hex is gradually decreased. The normalized coercive force Hc remains unchanged at about 1.2.

The magnetoresistive effect element is formed which comprises a lamination structure of glass substrate/NiO(5.0 nm)/Tb$_x$Co$_{1-x}$(10 nm)/Cu(2.5 nm)/Co$_{90}$Fe$_{10}$(2.0 nm)/Ni$_{80}$Fe$_{20}$(4 nm). The above layers are grown by magnetron sputtering system under application of magnetic field of 500 Oe.

FIG. 9 is a graph illustrative of variations in exchange-coupling magnetic field Hex and coercive force Hc of a pinned magnetic layer of Tb$_x$Co$_{1-x}$ versus index "x" of Tb$_x$Co$_{1-x}$. The rate of variation in magnetoresistance is about 4.6%.

FIG. 10 is a graph illustrative of variations in normalized exchange-coupling magnetic field Hex and normalized coercive force Hc of a pinned magnetic layer of Tb$_x$Co$_{1-x}$ versus index "x" of Tb$_x$Co$_{1-x}$, wherein the rate of variation in magnetoresistance is about 4.8%. A magnetic field of 500 Oe is applied in anti-parallel direction to the direction of the magnetic field application and a heat treatment is carried out at 120° C. for one hour. The normalized exchange-coupling magnetic field Hex means the value obtained by normalizing the exchange-coupling magnetic field Hex after the treatment with the exchange-coupling magnetic field Hex before the treatment. The normalized coercive force Hc means the value obtained by normalizing the coercive force Hc after the treatment with the coercive force Hc before the treatment. As the index x is increased, then the normalized exchange-coupling magnetic field Hex is increased up to 1.0 at x=0.2–0.3. As the index x is further increased from 0.3, the normalized exchange-coupling magnetic field Hex is gradually decreased. The normalized coercive force Hc remains unchanged at about 1.3.

The magnetoresistive effect element is formed which comprises a lamination structure of glass substrate/NiO(50 nm)/$Dy_xCo_{1-x}$(10 nm)/Cu(2.5 nm)/$Co_{90}Fe_{10}$(2.0 nm)/$Ni_{80}Fe_{20}$(4 nm). The above layers are grown by magnetron sputtering system under application of magnetic field of 500 Oe.

Figures 11, 12:
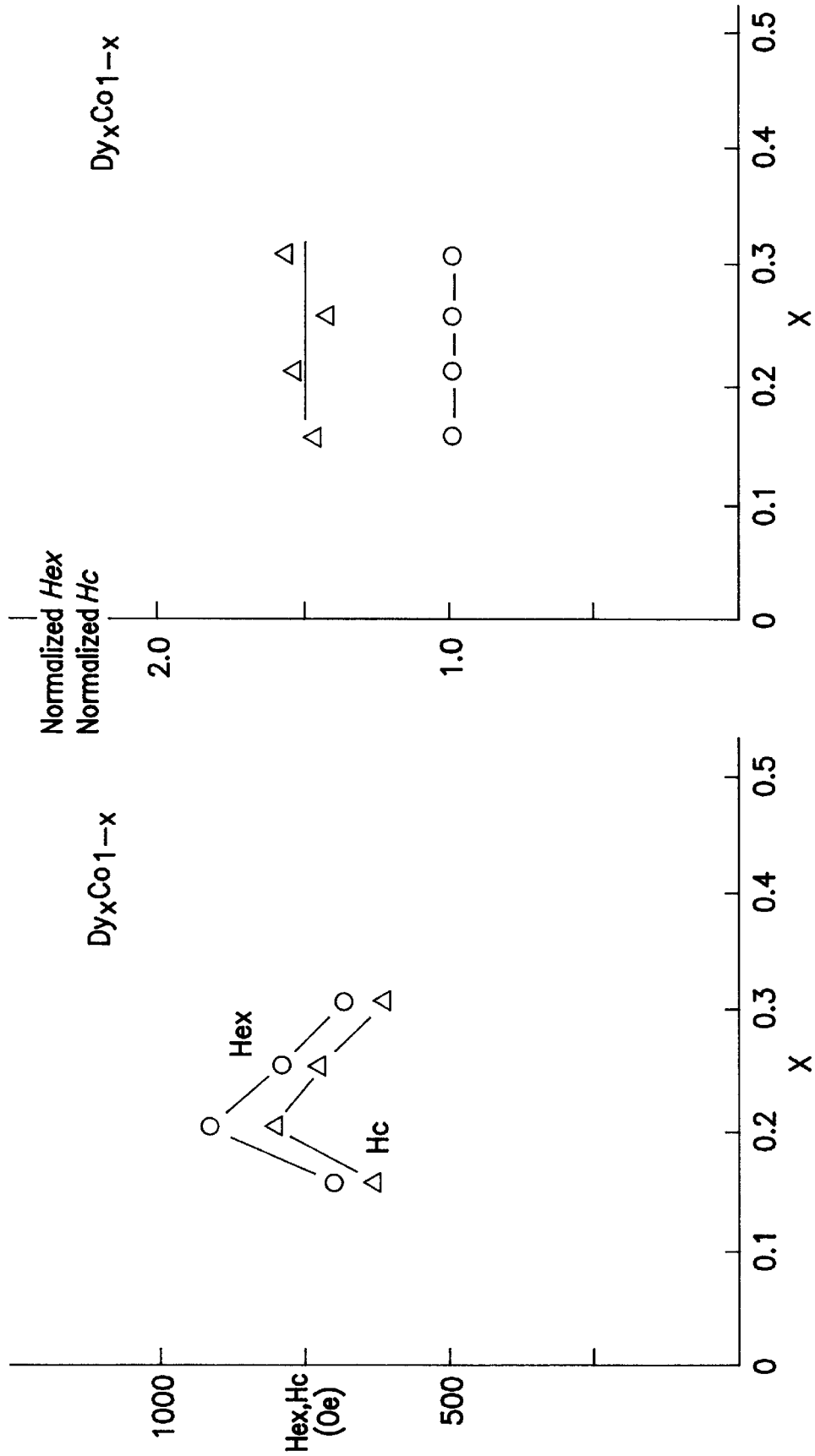
FIG. 11 is a graph illustrative of variations in exchange-coupling magnetic field Hex and coercive force Hc of a pinned magnetic layer of $Dy_xCo_{1-x}$ versus index "x" of $Dy_xCo_{1-x}$.
FIG. 12 is a graph illustrative of variations in normalized exchange-coupling magnetic field Hex and normalized coercive force Hc of a pinned magnetic layer of $Dy_xCo_{1-x}$ versus index "x" of $Dy_xCo_{1-x}$.

FIG. 11 is a graph illustrative of variations in exchange-coupling magnetic field Hex and coercive force Hc of a pinned magnetic layer of $Dy_xCo_{1-x}$ versus index "x" of $Dy_xCo_{1-x}$. The rate of variation in magnetoresistance is about 4.6%.

FIG. 12 is a graph illustrative of variations in normalized exchange-coupling magnetic field Hex and normalized coercive force Hc of a pinned magnetic layer of $Dy_xCo_{1-x}$ versus index "x" of $Dy_xCo_{1-x}$. A magnetic field of 500 Oe is applied in anti-parallel direction to the direction of the magnetic field application and a heat treatment is carried out at 120° C. for one hour. The normalized exchange-coupling magnetic field Hex means the value obtained by normalizing the exchange-coupling magnetic field Hex after the treatment with the exchange-coupling magnetic field Hex before the treatment. The normalized coercive force Hc means the value obtained by normalizing the coercive force Hc after the treatment with the coercive force Hc before the treatment. As the index x is increased, then the normalized exchange-coupling magnetic field Hex is increased up to 1.0 at x=0.15–0.3. As the index x is further increased from 0.3, the normalized exchange-coupling magnetic field Hex is gradually decreased. The normalized coercive force Hc remains unchanged at about 1.5.

The magnetoresistive effect element is formed which comprises a lamination structure of glass substrate/NiO(50 nm)/$Ho_xCo_{1-x}$(10 nm)/Cu(2.5 nm)/$Co_{90}Fe_{10}$(2.0 nm)/$Ni_{80}Fe_{20}$(4 nm). The above layers are grown by magnetron sputtering system under application of magnetic field of 500 Oe.

FIG. 13 is a graph illustrative of variations in exchange-coupling magnetic field Hex and coercive force Hc of a pinned magnetic layer of $Ho_xCo_{1-x}$ versus index "x" of $Ho_xCo_{1-x}$. The rate of variation in magnetoresistance is about 4.8%.

FIG. 14 is a graph illustrative of variations in normalized exchange-coupling magnetic field Hex and normalized coercive force Hc of a pinned magnetic layer of $Ho_xCo_{1-x}$ versus index "x" of $Ho_xCo_{1-x}$. A magnetic field of 500 Oe is applied in anti-parallel direction to the direction of the magnetic field application and a heat treatment is carried out at 120° C. for one hour. The normalized exchange-coupling magnetic field Hex means the value obtained by normalizing the exchange-coupling magnetic field Hex after the treatment with the exchange-coupling magnetic field Hex before the treatment. The normalized coercive force Hc means the value obtained by normalizing the coercive force Hc after the treatment with the coercive force Hc before the treatment. As the index x is increased, then the normalized exchange-coupling magnetic field Hex is increased up to 1.0 at x=0.2–0.25. As the index x is further increased from 0.25, the normalized exchange-coupling magnetic field Hex is gradually decreased. The normalized coercive force Hc remains unchanged at about 1.7.

The magnetoresistive effect element is formed which comprises a lamination structure of glass substrate/NiO(50 nm)/$(GdTb)_x(FeCo)_{1-x}$(10 nm)/Cu(2.5 nm)/$Co_{90}Fe_{10}$(2.0 nm)/$Ni_{80}Fe_{20}$(4 nm). The above layers are grown by magnetron sputtering system under application of magnetic field of 500 Oe.

FIG. 15 is a graph illustrative of variations in exchange-coupling magnetic field Hex and coercive force Hc of a pinned magnetic layer of $(GdTb)_x(FeCo)_{1-x}$ versus index "x" of $(GdTb)_x(FeCo)_{1-x}$. The rate of variation in magnetoresistance is about 4.8%.

FIG. 16 is a graph illustrative of variations in normalized exchange-coupling magnetic field Hex and normalized coercive force Hc of a pinned magnetic layer of $(GdTb)_x(FeCo)_{1-x}$ versus index "x" of $(GdTb)_x(FeCo)_{1-x}$. A magnetic field of 500 Oe is applied in anti-parallel direction to the direction of the magnetic field application and a heat treatment is carried out at 120° C. for one hour. The normalized exchange-coupling magnetic field Hex means the value obtained by normalizing the exchange-coupling magnetic field Hex after the treatment with the exchange-coupling magnetic field Hex before the treatment. The normalized coercive force Hc means the value obtained by normalizing the coercive force Hc after the treatment with the coercive force Hc before the treatment. As the index x is increased, then the normalized exchange-coupling magnetic field Hex is increased up to 1.0 at x=0.2–0.25. As the index x is further increased from 0.25, the normalized exchange-coupling magnetic field Hex is gradually decreased. The normalized coercive force Hc remains unchanged at about 1.3.

The magnetoresistive effect element is formed which comprises a lamination structure of glass substrate/NiO(50 nm)/pinned magnetic layer/Cu(2.5 nm)/$Co_{90}Fe_{10}$(2.0 nm)/$Ni_{80}Fe_{20}$(4 nm). FIG. 17 is a graph illustrative of variation in normalized exchange-coupling magnetic field Hex of a pinned magnetic layer versus the product of Ms·h of the saturation magnetization of the pinned magnetic layer and the thickness of the pinned magnetic layer, where an anti-ferromagnetic layer is made of NiO, in accordance with the present invention. If the product of Ms·h of the saturation magnetization of the pinned magnetic layer and the thickness of the pinned magnetic layer is not more than $2 \times 10^{-9}$ T·m, then the normalized exchange-coupling magnetic field Hex is not less than 0.9. This means that the pinned magnetic layer has a sufficient thermal stability the exchange-coupling magnetic field Hex under the above condition.

The magnetoresistive effect element is formed which comprises a lamination stricture of glass substrate/FeMn(10 nm)/pinned magnetic layer/Cu(2.5 nm)/$Co_{90}Fe_{10}$(2.0 nm)/$Ni_{80}Fe_{20}$(4 nm). FIG. 18 is a graph illustrative of variation in normalized exchange-coupling magnetic field Hex of a pinned magnetic layer versus the product of Ms·h of the saturation magnetization of the pinned magnetic layer and the thickness of the pinned magnetic layer, where an anti-ferromagnetic layer is made of FeMn, in accordance with the present invention. If the product of Ms·h of the saturation magnetization of the pinned magnetic layer and the thickness of the pinned magnetic layer is not more than $2.2 \times 10^{-9}$ T·m, then the normalized exchange-coupling magnetic field Hex is not less than 0.8. This means that the pinned magnetic layer has a sufficient thermal stability the exchange-coupling magnetic field Hex under the above condition.

Figure 19:
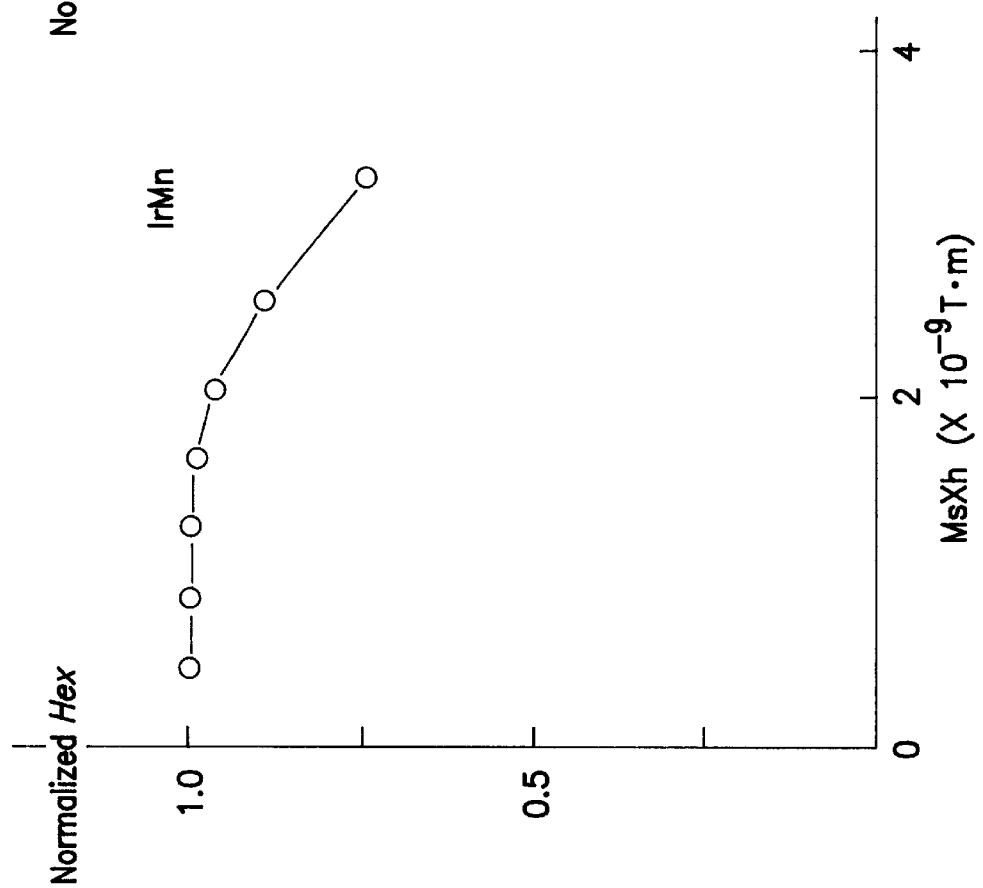
FIG. 19 is a graph illustrative of variation in normalized exchange-coupling magnetic field Hex of a pinned magnetic layer versus the product of Ms·h of the saturation magnetization of the pinned magnetic layer and the thickness of the pinned magnetic layer, where an anti-ferromagnetic layer is made of IrMn, in accordance with the present invention.

The magnetoresistive effect element is formed which comprises a lamination stricture of glass substrate/IrMn(10 nm)/pinned magnetic layer/Cu(2.5 nm)/Co$_{90}$Fe$_{10}$(2.0 nm)/Ni$_{80}$Fe$_{20}$(4 nm). FIG. 19 is a graph illustrative of variation in normalized exchange-coupling magnetic field Hex of a pinned magnetic layer versus the product of Ms·h of the saturation magnetization of the pinned magnetic layer and the thickness of the pinned magnetic layer, where an anti-ferromagnetic layer is made of IrMn, in accordance with the present invention. If the product of Ms·h of the saturation magnetization of the pinned magnetic layer and the thickness of the pinned magnetic layer is not more than 2.5×10$^{-9}$ T·m, then the normalized exchange-coupling magnetic field Hex is not less than 0.9. This means that the pinned magnetic layer has a sufficient thermal stability the exchange-coupling magnetic field Hex under the above condition.

Figure 20:
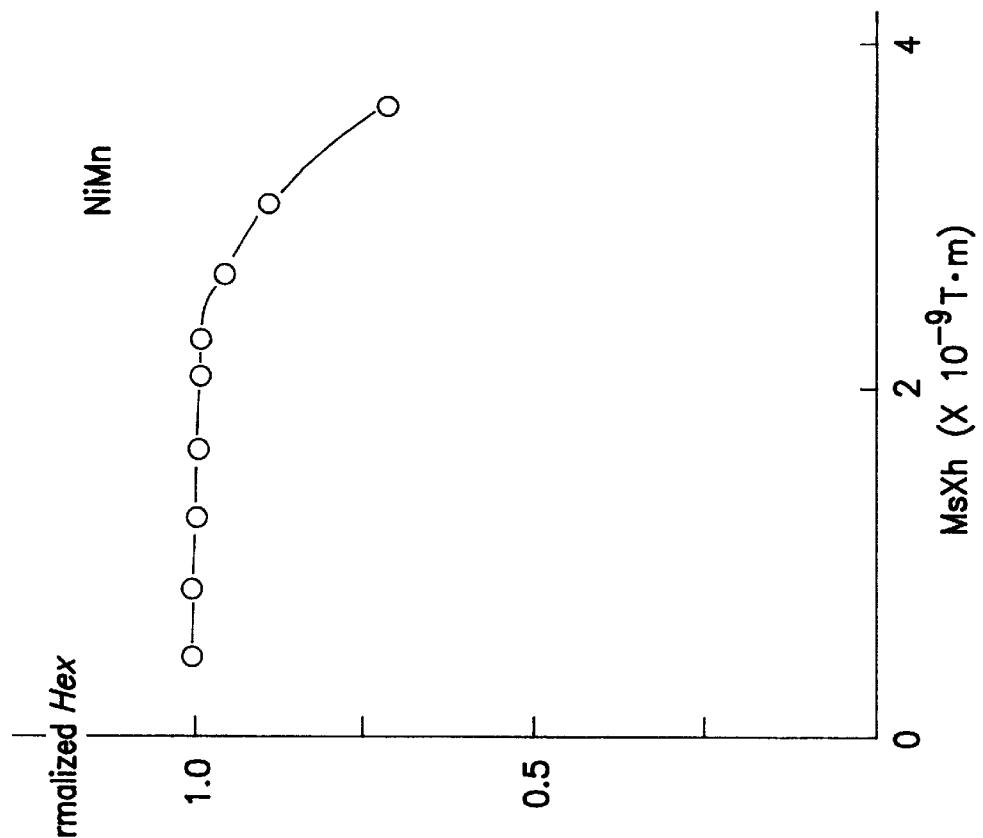
FIG. 20 is a graph illustrative of variation in normalized exchange-coupling magnetic field Hex of a pinned magnetic layer versus the product of Ms·h of the saturation magnetization of the pinned magnetic layer and the thickness of the pinned magnetic layer, where an anti-ferromagnetic layer is made of NiMn, in accordance with the present invention.

The magnetoresistive effect element is formed which comprises a lamination stricture of glass substrate/NiMn(10 nm)/pinned magnetic layer/Cu(2.5 nm)/Co$_{90}$Fe$_{10}$(2.0 nm)/Ni$_{80}$Fe$_{20}$(4 nm). FIG. 20 is a graph illustrative of variation in normalized exchange-coupling magnetic field Hex of a pinned magnetic layer versus the product of Ms·h of the saturation magnetization of the pinned magnetic layer and the thickness of the pinned magnetic layer, where an anti-ferromagnetic layer is made of NiMn, in accordance with the present invention. If the product of Ms·h of the saturation magnetization of the pinned magnetic layer and the thickness of the pinned magnetic layer is not more than 3.0×10$^{-9}$ T·m, then the normalized exchange-coupling magnetic field Hex is not less than 0.9. This means that the pinned magnetic layer has a sufficient thermal stability the exchange-coupling magnetic field Hex under the above condition.

Figure 21:
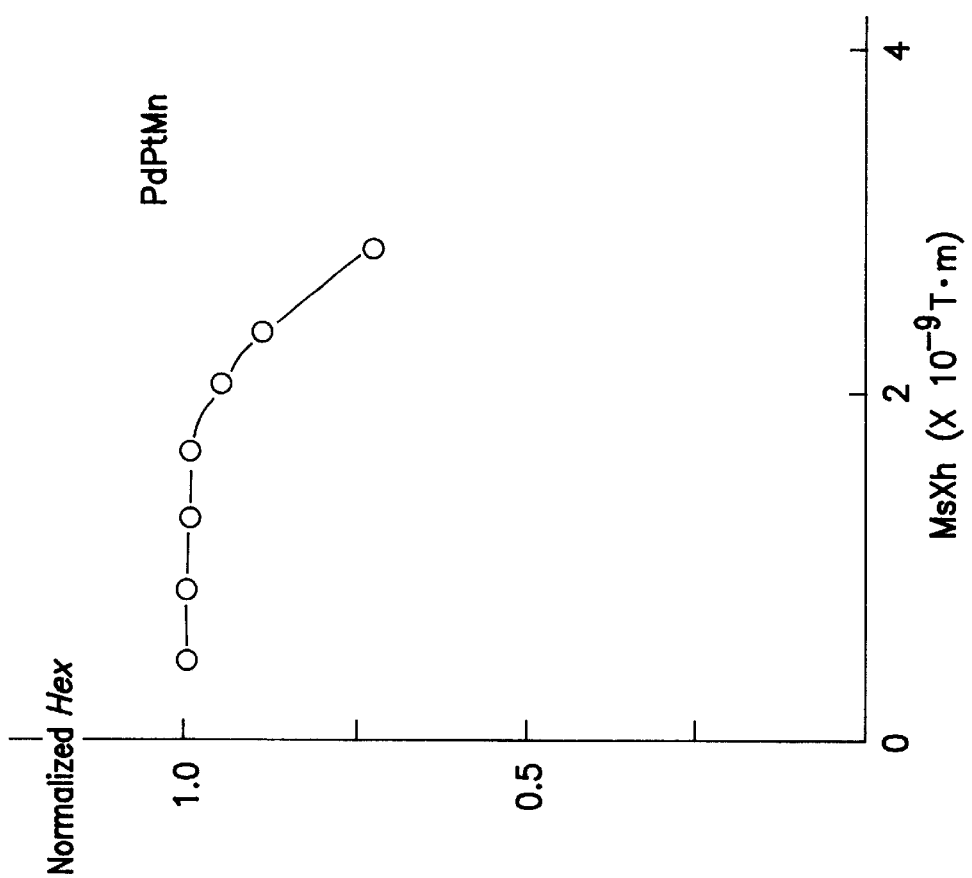
FIG. 21 is a graph illustrative of variation in normalized exchange-coupling magnetic field Hex of a pinned magnetic layer versus the product of Ms·h of the saturation magnetization of the pinned magnetic layer and the thickness of the pinned magnetic layer, where an anti-ferromagnetic layer is made of PdPtMn, in accordance with the present invention.

The magnetoresistive effect element is formed which comprises a lamination structure of glass substrate/PdPtMn (30 nm)/pinned magnetic layer/Cu(2.5 nm)/Co$_{90}$Fe$_{10}$(2.0 nm)/Ni$_{80}$Fe$_{20}$(4 nm). FIG. 21 is a graph illustrative of variation in normalized exchange-coupling magnetic field Hex of a pinned magnetic layer versus the product of Ms·h of the saturation magnetization of the pinned magnetic layer and the thickness of the pinned magnetic layer, where an anti-ferromagnetic layer is made of PdPtMn, in accordance with the present invention. If the product of Ms·h of the saturation magnetization of the pinned magnetic layer and the thickness of the pinned magnetic layer is not more than 2.3×10$^{-9}$ T·m, then the normalized exchange-coupling magnetic field Hex is not less than 0.9. This means that the pinned magnetic layer has a sufficient thermal stability the exchange-coupling magnetic field Hex under the above condition.

Figure 22:
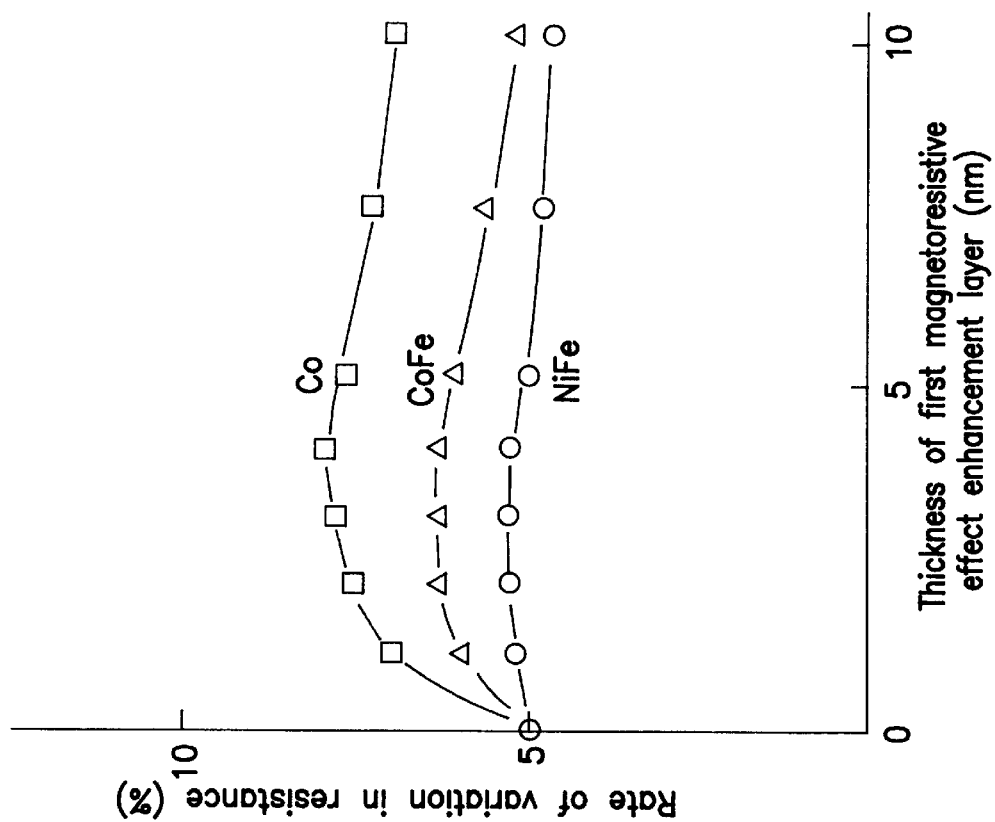
FIG. 22 is a graph illustrative of rate of variation in resistance versus a thickness of a first magnetoresistive effect enhancement layer in a magnetoresistive effect element in accordance with the present invention.

The magnetoresistive effect element is formed which comprises a lamination structure of glass substrate/NiO(500 nm)/GdTbCo(10 nm)/first magnetoresistive effect enhancement layer (X nm)/Cu(2.5 nm)/CoFe(2.0 nm)/NiFe(3 nm)/Cu(2 nm). FIG. 22 is a graph illustrative of rate of variation in resistance versus a thickness of a first magnetoresistive effect enhancement layer in a magnetoresistive effect element in accordance with the present invention. If the first magnetoresistive effect enhancement layer is made of NiFe, the rate of variation of the resistance is increased at a maximum rate of 0.4% from the case of no enhancement layer being formed. If the first magnetoresistive effect enhancement layer is made of CoFe, the rate of variation of the resistance is increased at a maximum rate of 1.4% from the case of no enhancement layer being formed. If the first magnetoresistive effect enhancement layer is made of Co, the rate of variation of the resistance is increased at a maximum rate of 3.1% from the case of no enhancement layer being formed.

The above spin vale films are applied to the magnetoresistive effect element of FIG. 5. The magnetoresistive effect sensor of FIG. 1 is formed. The bottom shielding layer is made of NiFe. The bottom gap layer is made of aluminum oxide. The magnetoresistive effect element has a lamination stricture of NiO(50 nm)/Gd$_x$Co$_{1-x}$(10 nm)/Co$_{90}$Fe$_{10}$(1.0 nm)/Cu(2.5 nm)/Co$_{90}$Fe$_{10}$(2.0 nm)/Ni$_{80}$Fe$_{20}$(4 nm). By photolithography process, the laminations are patterned to 1×1 micrometers. The bottom electrodes of CoCrPt and Mo are laminated on the edge of the above laminations. The top gap layer is made of aluminum oxide. The top shielding layer is made of NiFe. From the above magnetoresistive effect sensor, the magnetic recording/reproducing head slider of FIG. 3 is formed. CoCrTa system magnetic medium is used for magnetic recording and reproducing. A width of the write track is 1.5 micrometers. A gap of the write gap is 0.2 micrometers. A width of the read track is 1.0 micrometers. A gap of the read gap is 0.21 micrometers. The coercive force of the magnetic recording medium is 2.5 kOe. The reproducing output is measured by changing the recording mark length. The frequency is 150 kFCI at a mark length where the reproducing output is reduced by half. The reproducing output is 1.5 mV at peak-to-peak. Noise free symmetrical waveforms are obtained. The signal to noise ratio is 25.3 dB. The error rate is not more than 1×10$^{-6}$. This head is tested at 80° C. and 500 Oe. The error rate remains unchanged for 1500 hours.

The above anti-ferromagnetic layer is applied to the magnetoresistive effect element of FIG. 5. The magnetoresistive effect sensor of FIG. 2 is formed. The bottom shielding layer is made of FeTaN. The bottom gap layer is made of amorphous carbon. The magnetoresistive effect element has a lamination structure of NiO(50 nm)/Dy$_x$Co$_{1-x}$(10 nm)/Cu(2.5 nm)/Co$_{90}$Fe$_{10}$(2.0 nm)/Ni$_{80}$Fe$_{20}$(4 nm). By photolithography process, the laminations are patterned to 1×1 micrometers. The bottom electrodes of CoCrPt and Mo are laminated on part of the above laminations. The top gap layer is made of aluminum oxide. The top shielding layer is made of NiFe. From the above magnetoresistive effect sensor, the magnetic recording/reproducing head slider of FIG. 3 is formed. CoCrTa system magnetic medium is used for magnetic recording and reproducing. A width of the write track is 1.5 micrometers. A gap of the write gap is 0.2 micrometers. A width of the read track is 1.0 micrometers. A gap of the read gap is 0.21 micrometers. The coercive force of the magnetic recording medium is 2.5 kOe. The reproducing output is measured by changing the recording mark length. The frequency is 150 kFCI at a mark length where the reproducing output is reduced by half. The reproducing output is 1.6 mV at peak-to-peak. Noise free symmetrical waveforms are obtained. The signal to noise ratio is 24.6 dB. The error rate is not more than 1×10$^{-6}$. This head is tested at 80° C. and 500 Oe. The error rate remains unchanged for 1500 hours.

The magnetoresistive effect element of the present invention is applied to the magnetic disc device. The magnetic disc device has three magnetic discs over a base. A head driving circuit, signal processing circuit and input/output interface are accommodated on a bottom surface of the base. The magnetic disc device is connected to an external device via 32-bit bus line. Six heads are positioned over opposite surfaces of the three magnetic discs. A rotary actuator, driving and controlling circuits, and a spindle motor for disc rotation are mounted. A diameter of the discs is 46 millimeters. Data are stored in the area of 10–40 millimeters in diameter of the disc. The buried servo system is used. No exposed servo surface exists for high density recording. This device is directly connectable to the computer as external memory. A cache memory is mounted for the input/output interface for response to the bus line of a transmission rate of 5–20 Mbytes. It is possible to connect a plurality of the above disc devices under the control of an external controller for realizing a large capacity magnetic disc device.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A magnetoresistive effect element having a lamination structures of a free magnetic layer, a non-magnetic layer in contact with the free magnetic layer, a pinned magnetic layer in contact with said non-magnetic layer, and an anti-ferromagnetic layer in contact with the pinned magnetic layer, wherein the product of a saturation magnetization of the pinned magnetic layer and a thickness of the pinned magnetic layer is not higher than $2 \times 10^{-9}$ T·m.

2. The magnetoresistive effect element as claimed in claim 1, wherein the pinned magnetic layer is made of a ferrimagnetic material.

3. The magnetoresistive effect element as claimed in claim 1, wherein the pinned magnetic layer is made of an alloy of a first metal including at least one selected from the group consisting of lanthanoids and a second metal including at least one selected from the group consisting of Fe, Co, and Ni.

4. The magnetoresistive effect element as claimed in claim 1, wherein the pinned magnetic layer is made of a Garnet material.

5. A lamination structure of a pinned magnetic layer and an anti-ferromagnetic layer in a magnetoresistive effect element, wherein the product of a saturation magnetization of the pinned magnetic layer and a thickness of the pinned magnetic layer is not higher than $2 \times 10^{-9}$ T·m.

6. The magnetoresistive effect element as claimed in claim 5, wherein the pinned magnetic layer is made of a ferrimagnetic material.

7. The magnetoresistive effect element as claimed in claim 5, wherein the pinned magnetic layer is made of an alloy of a first metal including at least one selected from the group consisting of lanthanoids and a second metal including at least one selected from the group consisting of Fe, Co, and Ni.

8. The magnetoresistive effect element as claimed in claim 5, wherein the pinned magnetic layer is made of a Garnet material.

9. A magnetoresistive effect sensor having a magnetoresistive effect element having a lamination structures of a free magnetic layer, a non-magnetic layer in contact with the free magnetic layer, a pinned magnetic layer in contact with said non-magnetic layer, and an anti-ferromagnetic layer in contact with the pinned magnetic layer, wherein the product of a saturation magnetization of the pinned magnetic layer and a thickness of the pinned magnetic layer is not higher than $2 \times 10^{-9}$ T·m.

10. The magnetoresistive effect sensor as claimed in claim 9, wherein the pinned magnetic layer is made of a ferrimagnetic material.

11. The magnetoresistive effect sensor as claimed in claim 9, wherein the pinned magnetic layer is made of an alloy of a first metal including at least one selected from the group consisting of lanthanoids and a second metal including at least one selected from the group consisting of Fe, Co, and Ni.

12. The magnetoresistive effect sensor as claimed in claim 9, wherein the pinned magnetic layer is made of a Garnet material.

13. A magnetoresistive effect sensor having a magnetoresistive effect element having a lamination structure of a pinned magnetic layer and an anti-ferromagnetic layer, wherein the product of a saturation magnetization of the pinned magnetic layer and a thickness of the pinned magnetic layer is not higher than $2 \times 10^{-9}$ T·m.

14. The magnetoresistive effect sensor as claimed in claim 13, wherein the pinned magnetic layer is made of a ferrimagnetic material.

15. The magnetoresistive effect sensor as claimed in claim 13, wherein the pinned magnetic layer is made of an alloy of a first metal including at least one selected from the group consisting of lanthanoids and a second metal including at least one selected from the group consisting of Fe, Co, and Ni.

16. The magnetoresistive effect sensor as claimed in claim 13, wherein the pinned magnetic layer is made of a Garnet material.

17. A magnetoresistive effect element having at least a pinned magnetic layer, wherein the product of a saturation magnetization of the pinned magnetic layer and a thickness of the pinned magnetic layer is not higher than $2 \times 10^{-9}$ T·m.

18. The magnetoresistive effect element as claimed in claim 17, wherein the pinned magnetic layer is made of a ferrimagnetic material.

19. The magnetoresistive effect element as claimed in claim 17, wherein the pinned magnetic layer is made of an alloy of a first metal including at least one selected from the group consisting of lanthanoids and a second metal including at least one selected from the group consisting of Fe, Co, and Ni.

20. The magnetoresistive effect element as claimed in claim 17, wherein the pinned magnetic layer is made of a Garnet material.

21. A magnetoresistive effect sensor having a magnetoresistive effect element having at least a pinned magnetic layer, wherein the product of a saturation magnetization of the pinned magnetic layer and a thickness of the pinned magnetic layer is not higher than $2 \times 10^{-9}$ T·m.

22. The magnetoresistive effect sensor as claimed in claim 21, wherein the pinned magnetic layer is made of a ferrimagnetic material.

23. The magnetoresistive effect sensor as claimed in claim 21, wherein the pinned magnetic layer is made of an alloy of a first metal including at least one selected from the group consisting of lanthanoids and a second metal including at least one selected from the group consisting of Fe, Co, and Ni.

24. The magnetoresistive effect element as claimed in claim 21, wherein the pinned magnetic layer is made of a Garnet material.

25. A magnetoresistive effect element comprising:

an anti-ferromagnetic layer abutting a pinned magnetic layer, wherein a product of a saturation magnetization of said pinned layer and a thickness of said pinned layer is not higher than $2\times10^{-9}$ T·m to prevent inversion of a magnetization direction of said pinned layer, and wherein said pinned layer comprises a lanthanide metal.

26. The element of claim 25, wherein said pinned layer comprises at least one of the metals selected from the group consisting of GdFe, GdFeCo, TbFe, TbFeCo, DyFe, DyFeCo, HoFe, HoFeCo, NdFe, and NdFeCo.

* * * * *